United States Patent
Fast

(10) Patent No.: US 10,517,288 B2
(45) Date of Patent: Dec. 31, 2019

(54) BENTHIC BARRIER MAT AND METHOD

(71) Applicant: Douglas Fast, Hastings, MI (US)

(72) Inventor: Douglas Fast, Hastings, MI (US)

(*) Notice: Subject to any disclaimer, the term of this patent is extended or adjusted under 35 U.S.C. 154(b) by 0 days.

(21) Appl. No.: 16/190,743

(22) Filed: Nov. 14, 2018

(65) Prior Publication Data
US 2019/0075779 A1 Mar. 14, 2019

Related U.S. Application Data

(62) Division of application No. 15/008,690, filed on Jan. 28, 2016, now Pat. No. 10,159,240.

(51) Int. Cl.
*A01M 21/00* (2006.01)
*E02B 3/04* (2006.01)
*E02B 3/12* (2006.01)

(52) U.S. Cl.
CPC .............. *A01M 21/00* (2013.01); *E02B 3/04* (2013.01); *E02B 3/126* (2013.01)

(58) Field of Classification Search
CPC ................ A01G 13/02; A01G 13/0256; A01G 13/0268; A01G 13/00; A01G 13/0206; A01G 13/0225; A01G 2013/046; A01M 21/02; A01D 44/00; A47G 9/06
See application file for complete search history.

(56) References Cited

U.S. PATENT DOCUMENTS

| | | | | |
|---|---|---|---|---|
| 2,611,906 A * | 9/1952 | Backer | ................... | A47C 17/66 38/111 |
| 2,970,323 A * | 2/1961 | Griffith | ................... | A47C 17/80 5/118 |
| 3,543,310 A * | 12/1970 | Smith | ................... | A47C 17/64 297/440.11 |
| 4,688,281 A * | 8/1987 | Lantz | ................... | A47C 19/005 5/111 |
| 6,014,837 A * | 1/2000 | Morgan | ............ | A01G 13/0212 135/125 |
| 6,209,486 B1 * | 4/2001 | Reynolds | ............. | A01K 1/0353 119/161 |
| 7,748,432 B2 * | 7/2010 | Huang | ................... | B60J 1/2091 160/370.21 |
| 7,748,433 B2 * | 7/2010 | Huang | ................... | B60J 1/2011 160/370.21 |
| 8,919,284 B2 * | 12/2014 | Wolfe, Jr. | ............... | A01K 15/02 119/28.5 |
| 9,445,552 B2 * | 9/2016 | Hawkinson | ............ | A01G 13/02 |

* cited by examiner

*Primary Examiner* — Kristen C Hayes
(74) *Attorney, Agent, or Firm* — Mitchell Intellectual Property Law, PLLC

(57) ABSTRACT

A benthic barrier in which a polygonal shaped mat having straight sides is mounted on a similarly polygonal frame, but in which the frame sides bow out slightly between corners, causing the mat to stretch slightly and become taut. The frame comprises a plurality of straight leg members and a number of corner members as required by said polygonal shape. The corner members encompass interior angles which are from about 1 to about 5 degrees greater than the interior angle of the polygon defined by the straight sides of the mat. The frame member legs are rigid, but slightly flexible such that when assembled into the mat as an assembled frame, the straight legs are forced to bow out slightly between the corners, pulling the mat taut.

20 Claims, 7 Drawing Sheets

BENTHIC BARRIER MAT AND METHOD

FIELD AND BACKGROUND

The present invention relates to the field of "benthic barriers," so called because they are barriers to the bottom of an area of water. The benthic zone is the ecological region at the lowest level of a body of water such as a lake, including the sediment surface and some sub-surface layers. Such barriers are typically placed in "photic zones," which are areas where enough sunlight reaches the benthic area to permit photosynthesis, allowing aquatic plant growth. Benthic Barriers are intended to block sunlight from reaching lake bottoms, thereby preventing photosynthesis and eliminating unwanted, aquatic plant growth in specific areas where benthic barriers are placed.

Know by common names such as, "lake weed control mats," "seaweed mats" and simply, "weed mats," crude versions of benthic barriers have been used in the United States for well over 100 years. Early benthic barriers were first fashioned of materials such as burlap and canvas to block sunlight and were held on the bottom primarily with rocks. Primitive frames were sometimes constructed with iron bars or fencing to hold the fabrics in place. In some mats, metal bars, like reinforcing rod, have been placed transversely across the mat. Others attach frames on the perimeter of the fabric. Remarkably, many homemade frames were made of wood (which floats). Other frames have been fashioned from steel reinforcing rod, which is a soft, flexible bar, with a very low "bend moment."

Some of these barriers today comprise a polymeric fabric mat. In some, the polymeric fabric mat is surrounded by a rectangular frame to which the mat is secured. Some mats include small gas relief openings in the body of the mat, so that gas coming up from beneath the mat can escape through those openings. A mat sold by Lacey Inc. is provided with semi-circular slits in the mat, to define openings with adjacent flaps. This allows the mats to settle to the bottom of the lake more quickly, and also facilitates the escape of gas which tends to bubble up beneath the mat and lift the flaps out of the way.

SUMMARY OF THE INVENTION

The present invention is a benthic barrier in which a polygonal shaped mat having straight sides is mounted on a similarly polygonal frame, but in which the frame sides bow out slightly between corners, causing the mat to stretch slightly and become taut. The frame comprises a plurality of straight leg members and a number of corner members as required by said polygonal shape. The corner members encompass interior angles which are from about 1 to about 5 degrees greater than the interior angle of the polygon defined by the straight sides of the mat. The frame member legs are rigid, but slightly flexible such that when assembled into the mat as an assembled frame, the straight legs are forced to bow out slightly between the corners, pulling the mat taut.

Surprisingly, this facilitates the removal of naturally occurring gases from below the barrier, rather than collecting beneath the mat and making it unstable. These and other objects, advantages and features of the invention will be further understood and appreciated by reference to the drawings and written description set forth below.

DESCRIPTION OF THE PREFERRED EMBODIMENTS

Figure 1:
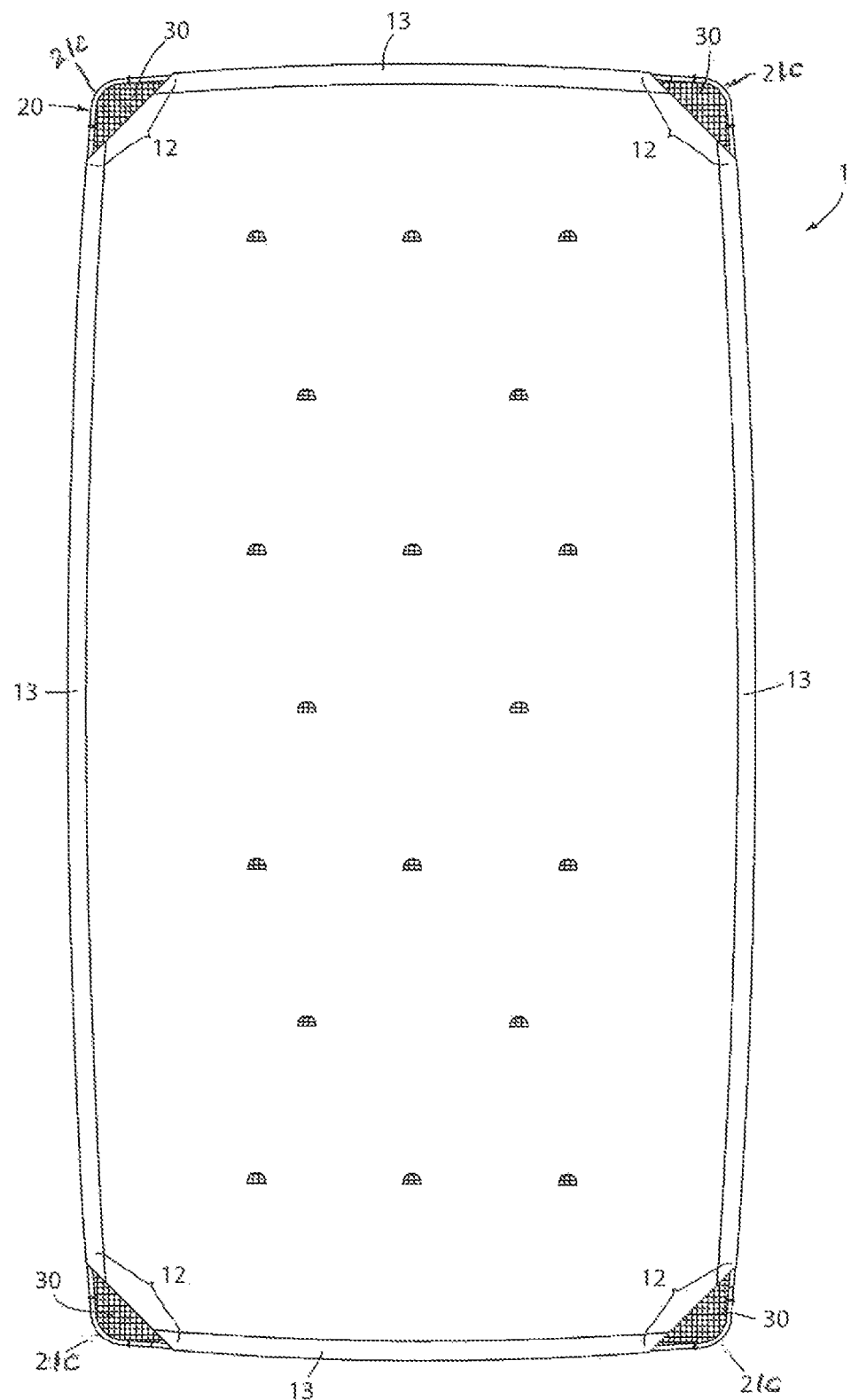
FIG. 1 is a plan view of a preferred embodiment benthic barrier with mat and frame assembled together, and with a support grid secured thereto on the underside of the mat.
Figure 2:
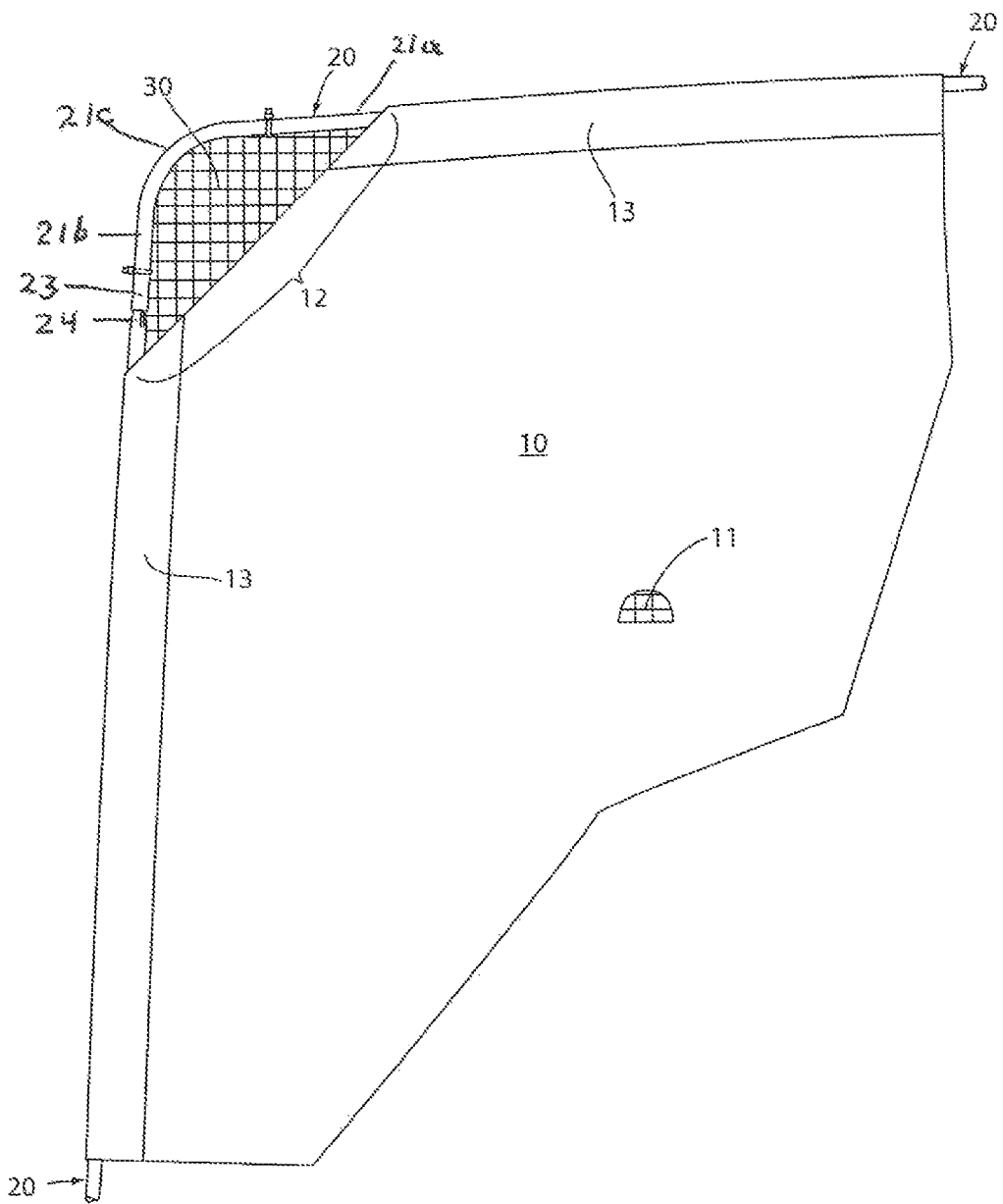
FIG. 2 is an enlarged view of a corner portion of the benthic barrier.
Figure 3:
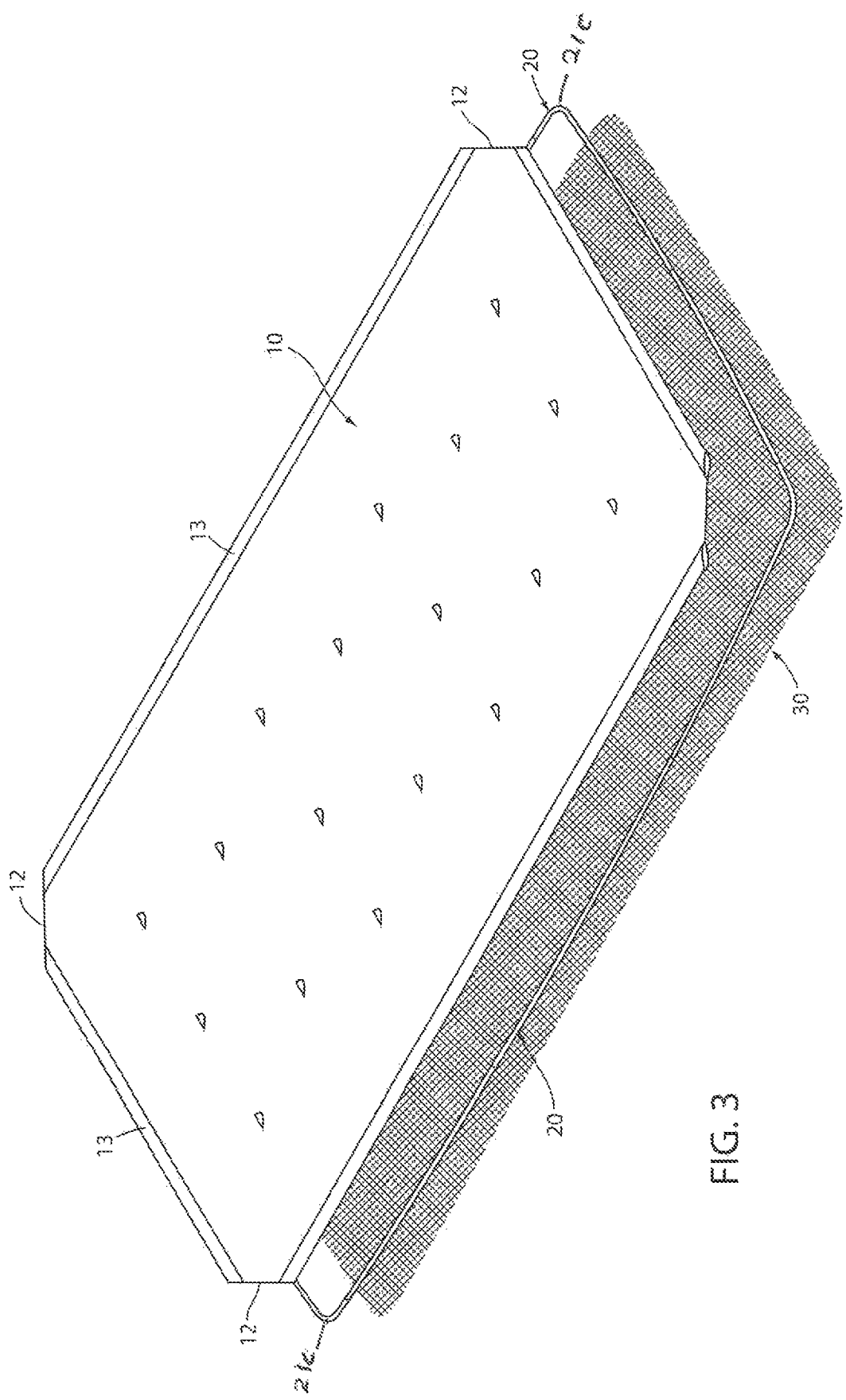
FIG. 3 is a perspective view of the mat, the assembled frame, and the supporting grid exploded away from one another.

The benthic barrier 1 of the preferred embodiment comprises mat 10, frame 20, and optionally a grid under support 30, shown assembled in FIG. 1, and exploded away from one another in FIG. 3 (FIGS. 1 and 3). Frame 20 is formed of plural frame members 21 and 22 which comprise legs which are straight when frame 20 is unassembled (FIG. 4), but which are forced to bow out slightly by the configuration of the corners 21c when assembled (FIGS. 1, 2 and 3). The barriers 1 can come in varying polygonal shapes and dimensions, such as rectangles 8 ft by 8 ft., 12 ft. by 14 ft., 12 ft. by 24 ft., etc. The various components of barrier 1 are numbered herein as follows:

| | |
|---|---|
| Benthic barrier | 1 |
| Mat | 10 |
| Gas relief ports | 11 |
| Corner cutaway | 12 |
| Frame pockets | 13 |
| Frame | 20 |
| Corner frame members | 21 |
| Straight legs | 21a and 21b |
| Corner | 21c |
| Straight frame members | 22 |
| Frame socket ends | 23 |
| Frame plug ends | 24 |
| Grid | 30 |
| Grid connectors | 31 |

Mat 10 is preferably made of a water and gas permeable material such as a non-woven fabric. Materials which are not permeable to water and gases are lethal to all small beatific organisms that help sustain the health of a body of water. Preferably the non-woven fabric is of a polymeric material which is resistant to degradation and decay. Non-woven geotextile fabric is preferable. It is a non-elastic material, but it is sufficiently slightly stretchable, such that it can be made taut when frame members 21 and 22 are located in pockets 13 and assembled together, with the sides of frame 20 bowing out slightly. Pockets 13 are formed by folding mat 10 over on itself and sewing or welding overlapping edge portion to the body of the mat.

Figure 4:
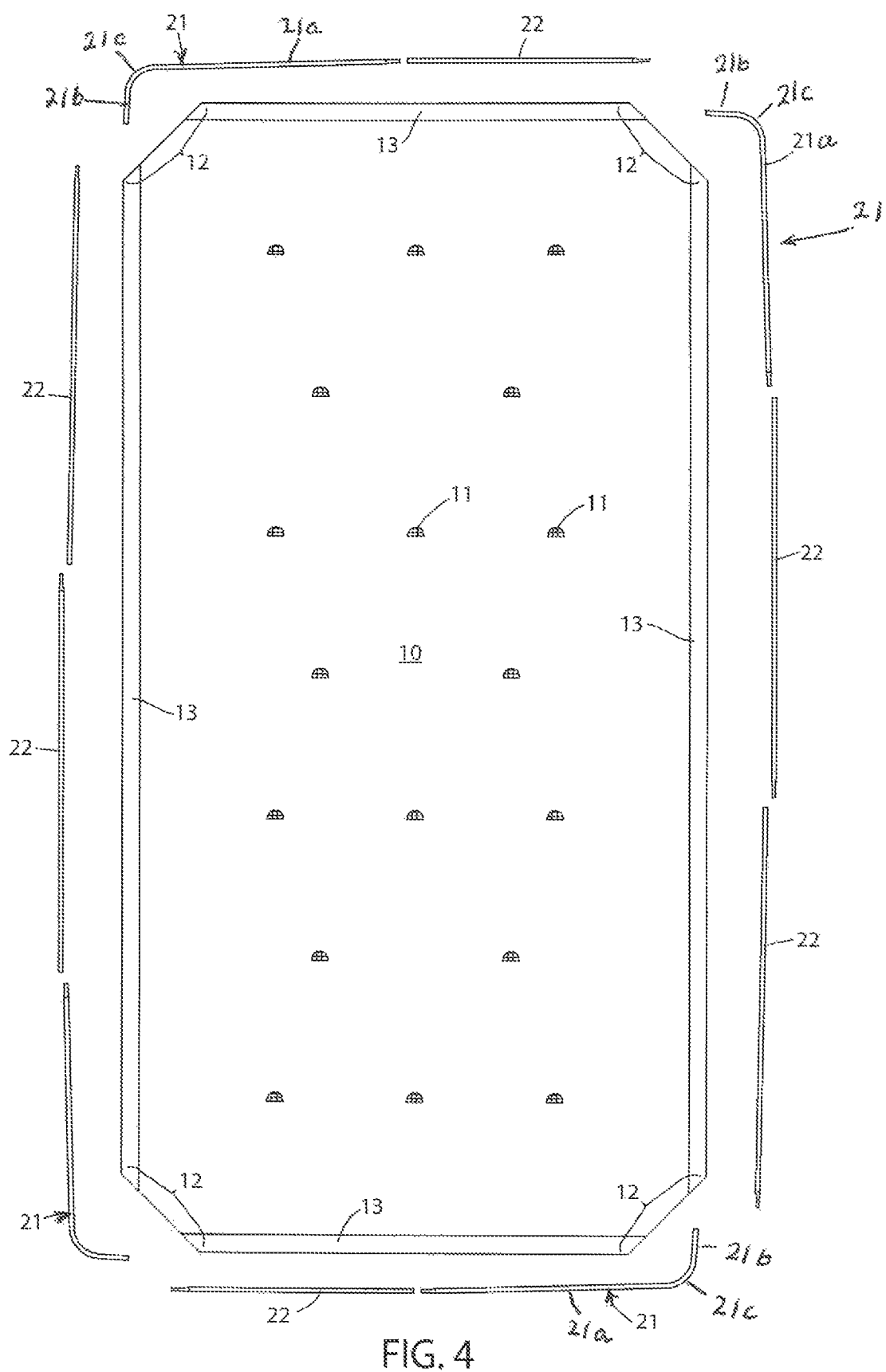
FIG. 4 is a plan view of the mat and frame members separate from each other.
Figure 6:
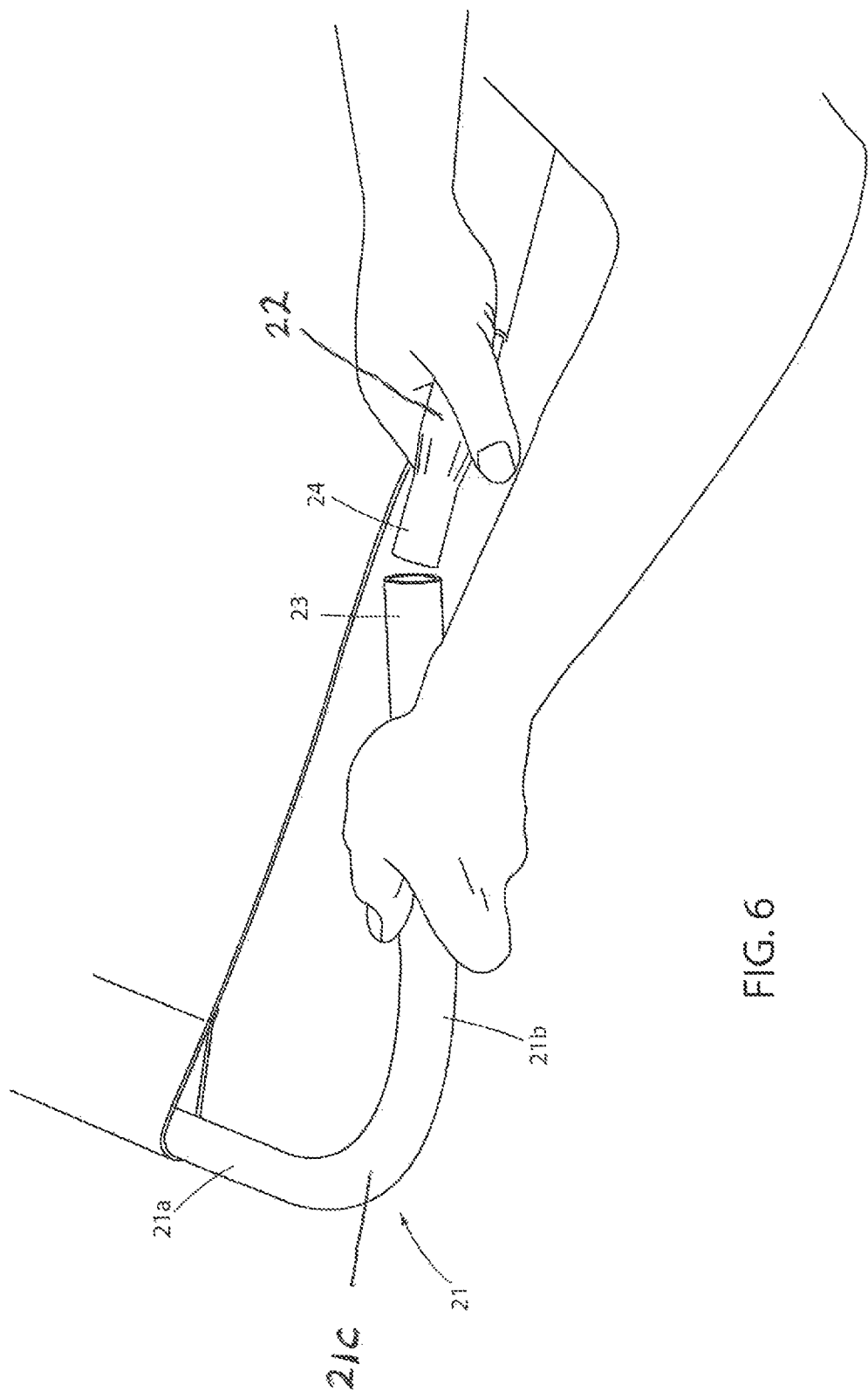
FIG. 6 is a perspective view of frame members, which are positioned within receiving pockets of the mat, being assembled together.
Figure 7A:
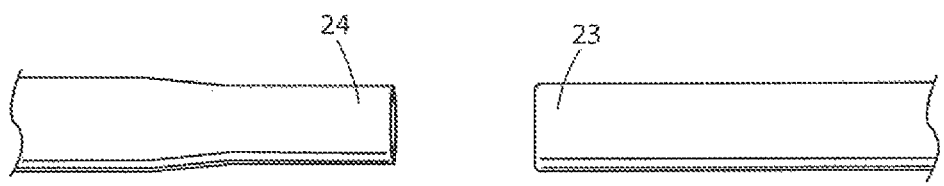
FIG. 7A is a close up view of the joining ends of frame members spaced slightly apart.
Figure 7B:
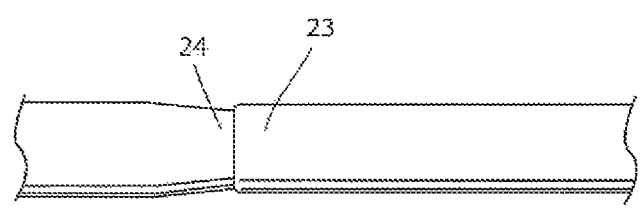
FIG. 7B is a close up view of the joining ends of frame members joined together.

Mat 10 is polygonal in configuration, e.g. rectangular as shown, with straight sides (FIGS. 3 and 4). At its sides, mat 10 is formed into pockets 13, for receiving frame members 21 and 22 (FIGS. 1, 3 and 4). Mat 10 is cut away 12 at its corners to facilitate insertion of frame members 21 and 22 into pockets 13. The cut away portion is triangular, and preferably leaves a cut away corner sufficiently large that frame members 21 and 22 can be conveniently joined at the cut away corner (FIG. 6). The term "cutaway" as used herein refers to the fact that a portion of the corner is missing. It does not mean literally that the mat was actually "cut," though that is one way to create the cut away corner. The corner of the mat could alternatively have been folded over, the mat could have been produced without the corner portion, etc.

Even though they are gas permeable, mats 10 also include gas relief ports 11, which facilitate release of gas which builds up beneath benthic barrier 1 in use, faster than it can dissipate through the permeable non-woven fabric of mat 10. These may be a small opening cut in mat 10, or a flap cut into mat 10, which covers the opening but allows gas build up to escape. The opening is about 1-3 inches in diameter. As shown in the drawings, the opening and its associated flap are semicircles, or "half-moons" with a 1.5 inch radius. However, other configurations for the "port" could be used, e.g. "v" shaped, with or without flaps, rectangular, etc.

Frame 20 is formed of corner defining members 21 and straight frame members 22. Corner members define the corners 21c of frame 20, and include straight legs 21a and 21b extending away from corner 21c. Leg 21a is longer while leg 21b is relatively short. Straight frame members 22 would typically be 4 to 6 feet long. The long legs 21a of corner members 21 are preferably about 4 feet long, while short leg 21b is about 1 foot long. The frame members are made of a material which is rigid, but the legs of which can be forced.

The ends of each frame member 21 and 22 serve either as a narrowed plug 24 or a socket 23 for receiving plug 24 (FIGS. 5, 6, 7A and 7B). Plug end 24 is swaged to reduce its diameter so that it fits into the socket end of the next adjacent frame member (See especially FIGS. 7A and 7B). It both forms a tight joint, but also assists in allowing the long straight legs of frame 20 to flex between corners.

Figure 5:
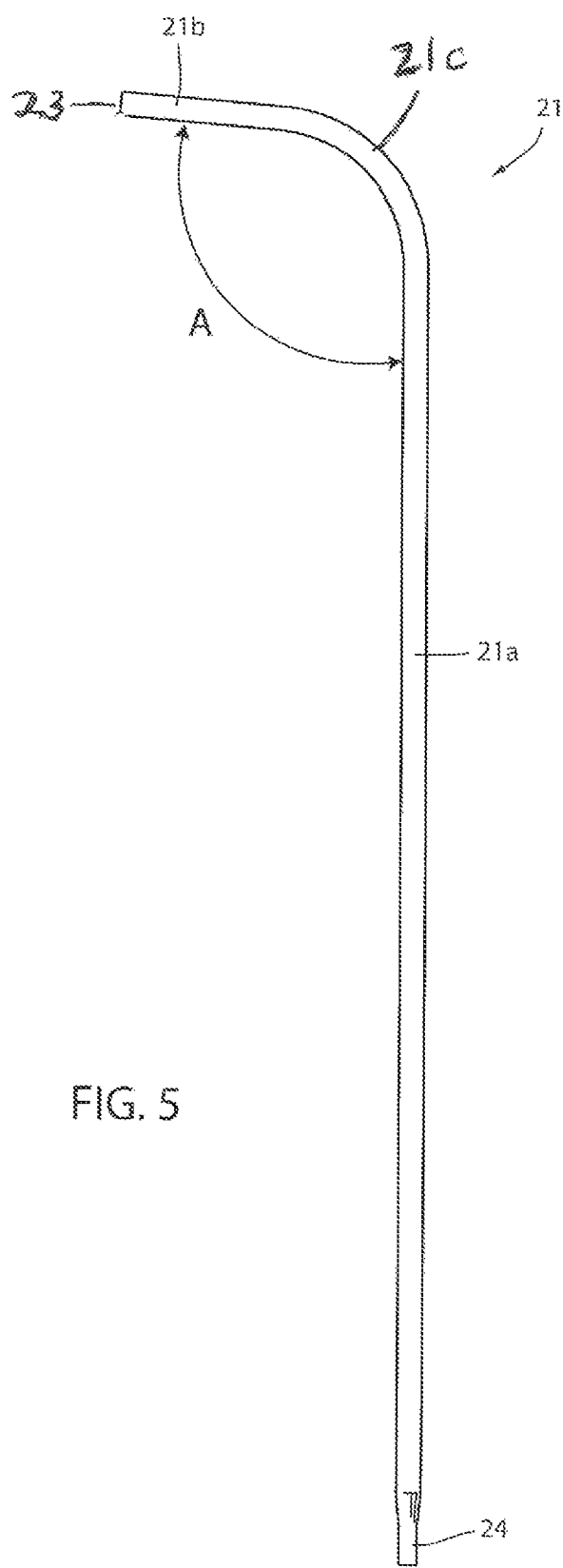
FIG. 5 is a plan view of a frame corner member.

The interior angle A encompassed by the corner portion 21c of corner member 21 is from about 1 to about 5 degrees greater than the interior angle of the polygon defined by mat 10 (FIG. 5). Thus mat 10 is rectangular, such that its straight sides, extended to intersection, would encompass a 90 degree angle. However angle A in FIG. 5 is actually 95 degrees.

To assemble frame 20 to mat 10, mat 10 is laid out flat on the ground with the frame members 21 and 22 surrounding it, as shown in FIG. 4. The straight members 22 are inserted into pockets 13 first, one at a time. Pockets 13 are about 3-5 inches wide, which facilitates insertion and manipulation of frame members into and within pockets 13. The end of the previously inserted frame member 22 is left exposed so the next frame member can be easily joined to it. The joints are preferably taped with duct tape.

The corner members 21 are joined last. The long leg 21a of each corner member is joined to its adjacent straight leg at each corner. Because of the cut away corners 12 of mat 10, the joining of the socket end of short leg 21b of each corner member to the plug end 24 of the free end of an adjacent straight member 22 is facilitated (See FIG. 6 and FIG. 2). As noted above, the cut away portion is triangular, and preferably leaves a cut away corner sufficiently large that frame members 21 and 22 can be conveniently joined at the cut away corner (FIG. 6). Thus for a corner frame member with a short leg 21b of about a foot in length, the hypotenuse of the cut away is about 25 inches, such that the legs of the cut away triangle are about 18 inches. This leaves about 5-6 inches of the adjacent straight frame member 22 for a user to grasp, while joining short leg 21b to straight frame member 22 (FIG. 6). The joint between joined plug 24 and socket 23 can be seen in FIG. 2, in the opening left by the cut away corner portion of mat 10.

As shown in FIG. 6, the assembler has grasped the end of straight frame member 22 with his right hand, and the short leg 21b of corner member 21 with his left. He pulls his right hand towards his body while pushing his left hand away, thus creating a separation between plug 24 and socket 23. Plug 24 is then inserted into socket 23 to complete the joining process. If the next adjacent corner or corners have already been joined, this joining will force the straight leg(s) 22 and/or 21a to bow outwardly slightly, and will also force the insertion of plug 24 into socket 23. Mat 10 is dimensioned such that this bowing of the side members of frame 20 draws mat 10 taught, placing it in tension within frame 10.

Example

Consider a mat with the dimensions of 12-feet by 24-feet. By creating corners that are 95 degrees (instead of the 90-degree corners of a standard rectangle) the center of the frame bows out to 13-feet in the center. Stretching non-woven fabric, sewn 12-feet wide, over a frame that is 13-feet wide in the center, pulls the frame inward while pulling the fabric taunt, much as a bow holds a bowstring taunt, by being cambered outward, away from the bowstring.

This taut condition of mat 10 within frame 20 leads to unexpected results. Preventing photosynthesis through the use of a benthic mat is relatively simple and easily understood by those of ordinary skill in the art. Releasing gases from the lake bottom is not. As aquatic plants die, the resulting biomass is broken down and digested by bacteria. During the decomposition process, several gases are released including oxygen (at first), nitrogen, carbon dioxide, and methane. Undigested biomass that sinks beneath the lake bottom soil must be digested by anaerobic bacteria, releasing ammonia, carbon dioxide and hydrogen sulfide. Surface gases tend to dissipate quickly, within two months, provided there's enough oxygen and aerobic bacteria to digest the plant matter. Deeper gases, like hydrogen sulfide, may have been created and trapped for hundreds or thousands of years. All of these gases rise and dissipate, when allowed to.

However even in mats which are gas permeable, and even in those with gas relief openings, these gases can bubble up so fast that they are trapped beneath the benthic mat. As more gases accumulate, the entire benthic barrier often lifts off the bottom, floating and losing its shape until the gases escape. Because assembled frame 10 holds the fabric mat 10 taut, particularly in the center, gases migrate more efficiently to the edges of the mat, and to gas-release ports 11 if they are used. There is less "loose" fabric to form pockets where gases can collect.

Optionally, a grid 30 such as a geogrid can be joined to the assembled frame 20 and mat 10, through the use of zip ties or the like. This gives benthic barrier 1 even greater stability on the lake floor, as it helps keep the barrier from shifting. Grid 30 creates a firm surface on which to walk over soft lake bottom soils. It acts as a giant "snowshoe" by distributing weight over a larger area, and hinders "lateral" soil movement.

This unique frame and fabric system allows for a relatively light, (60 to 70 lbs. dry) yet very study and extremely effective product that is easily installed, cleaned, moved and removed. It is stable in use, allowing gas bubbling up from below to flow readily to the edges and/or gas relief ports. Of course, it is understood that the forgoing is a preferred embodiment of the invention, and that various changes and alterations can be made without departing from the spirit and scope of the invention

The invention claimed is:

1. A benthic barrier comprising:
a polygonal shaped stretchable mat having straight sides prior to assembly into said benthic barrier, and corners between said sides; a frame comprised of corner members and rigid, but flexible legs which extend between and bow out between said frame corner members, said frame having a polygonal shape similar to that of said mat except for said legs bowing out between said corner members; said mat being assembled to said frame with said sides of said mat being secured to said bowed out legs of said frame, whereby said outward bow of frame legs cause said mat to stretch and become taut.

2. The benthic barrier of claim 1 in which said corner members encompass interior angles which are from about 1 to about 5 degrees greater than the interior angle of the polygon defined by said straight sides of said mat; said rigid but flexible frame member legs being straight legs prior to assembly to said corner members such that when assembled to said corner members, said straight legs are forced to bow out between said corners, pulling said mat taut.

3. The benthic barrier of claim 2 in which said mat includes a plurality of gas relief ports, which facilitate release of gas which builds up beneath said benthic barrier in use.

4. The benthic barrier of claim 3 in which said mat is made of a water and gas permeable material non-woven polymeric fabric.

5. The benthic barrier of claim 4 which a grid is joined to the said frame on the underside of said mat.

6. The benthic barrier of claim 5 in which said mat comprises pockets along each side into which said straight leg frame members are inserted as they are assembled into said mat.

7. The benthic barrier of claim 2 in which said mat is made of a water and gas permeable material non-woven polymeric fabric.

8. The benthic barrier of claim 7 in which said mat comprises pockets along each side into which said straight leg frame members are inserted as they are assembled into said mat.

9. The benthic barrier of claim 2 in which a grid is joined to the said frame on the underside of said mat.

10. The benthic barrier of claim 2 in which said mat comprises pockets along each side into which said straight leg frame members are inserted as they are assembled into said mat.

11. The benthic barrier of claim 10 which said mat is cut away at its corners to facilitate insertion of frame members into said pockets.

12. The benthic barrier of claim 10 which said corner members include a corner portion and at least one of said straight legs extending from said corner portion, for insertion into one of said mat pockets and connection to an adjacent straight leg.

13. The benthic barrier of claim 12 which said cut away portion is configured such that said corner frame members can be conveniently joined to an adjacent straight leg member at said cut away corner.

14. The benthic barrier of claim 12 which said mat is cut away at its corners to facilitate insertion of frame members into said pockets.

15. The benthic barrier of claim 14 which said cut away portion is configured such that said corner frame members can be conveniently joined to an adjacent one of said straight leg members at said cut away corner.

16. The benthic barrier of claim 15 which said corner member includes at least one short straight leg member extending away from said corner portion, which is short relative to the size of said cut away corner of said mat that an assembler can join said short leg to an adjacent one of said straight legs by grasping the end of said straight leg extending out of said mat pocket and grasping said short leg of said corner member with the other hand, and bring the two together at a joint which is located in said open cut away corner of said mat when said mat and frame are fully assembled together.

17. The benthic barrier of claim 16 which said mat includes a plurality of gas relief ports, which facilitate release of gas which builds up beneath said benthic barrier in use.

18. The benthic barrier of claim 17 which said mat is made of a water and gas permeable material.

19. The benthic barrier of claim 18 which said gas and water permeable material is a non-woven polymeric fabric.

20. The benthic barrier of claim 19 which a grid is joined to the said frame on the underside of said mat.

* * * * *